United States Patent
Shen et al.

(10) Patent No.: US 8,629,579 B2
(45) Date of Patent: Jan. 14, 2014

(54) ACTIVE SWITCHING RIPPLE FILTER

(75) Inventors: Miaosen Shen, Manchester, CT (US);
Vladimir Blasko, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 945 days.

(21) Appl. No.: 12/730,476

(22) Filed: Mar. 24, 2010

(65) Prior Publication Data
US 2011/0235373 A1    Sep. 29, 2011

(51) Int. Cl.
*H02J 1/02* (2006.01)
*H02M 1/12* (2006.01)

(52) U.S. Cl.
USPC .......................................................... 307/105

(58) Field of Classification Search
USPC .......................................................... 307/105
See application file for complete search history.

(56) References Cited

U.S. PATENT DOCUMENTS

| | | |
|---|---|---|
| 5,012,177 A | 4/1991 | Dhyanchand et al. |
| 5,057,214 A | 10/1991 | Morris |
| 5,142,468 A | 8/1992 | Nerem |
| 5,434,771 A | 7/1995 | Danby et al. |
| 6,370,049 B1 | 4/2002 | Heikkila |
| 7,109,681 B2 | 9/2006 | Baker et al. |
| 7,283,378 B2 | 10/2007 | Clemmons |
| 7,362,597 B2 | 4/2008 | Ishikawa et al. |
| 7,443,229 B1 | 10/2008 | Vinciarelli et al. |
| 2004/0071003 A1 | 4/2004 | Cocconi |

*Primary Examiner* — Hal Kaplan
(74) *Attorney, Agent, or Firm* — Carlson, Gaskey & Olds, P.C.

(57) ABSTRACT

An active switching ripple filter system removes ripple currents from a power signal and has a main inverter and an active switching ripple filter inverter whose outputs are combined to form an output power signal.

20 Claims, 3 Drawing Sheets

ACTIVE SWITCHING RIPPLE FILTER

BACKGROUND OF THE INVENTION

The present disclosure is directed to electrical power conversion systems, and specifically to a power conversion system having an active switching ripple filter.

In the field of power electronics, when multi-phase power is desired and a DC source is available, a switching inverter is typically used to convert the power from the DC power source into multi-phase power. Switching inverters output a number of pulse width modulated square waves equal to the number of desired phases. Each of the square waves is phase shifted from each of the other square waves. The outputs are then passed through a passive inductive filter, which converts the pulse width modulated square wave into a sinusoidal wave and a byproduct switching frequency ripple current as a secondary current waveform.

Similarly, an inverter can also be used to convert multi-phase AC sources to DC by reversing the power flow in the inverter. In this case, the passive inductive filter may also be used at the AC side to prevent noise from getting into the AC sources.

SUMMARY OF THE INVENTION

Disclosed is a power generation or rectification system, which has a DC power source with a main inverter and an active switching ripple filter inverter connected to the power source. An output of each of the inverters is connected to a corresponding set of filter inductors. The outputs of each of the sets of inductors are combined at an electrical node and the node outputs a power signal.

Also disclosed is a method for removing ripple currents from a power signal. The method operates two inverters at different switching frequencies. The inverter switching at lower frequency carries the main power and creates switching frequency current ripples at the output. An inverter with a much higher switching frequency absorbs the current ripple generated by the low frequency inverter and reduces the total output current ripple.

These and other features of the present invention can be best understood from the following specification and drawings, the following of which is a brief description.

DETAILED DESCRIPTION OF THE PREFERRED EMBODIMENT

Figure 1:
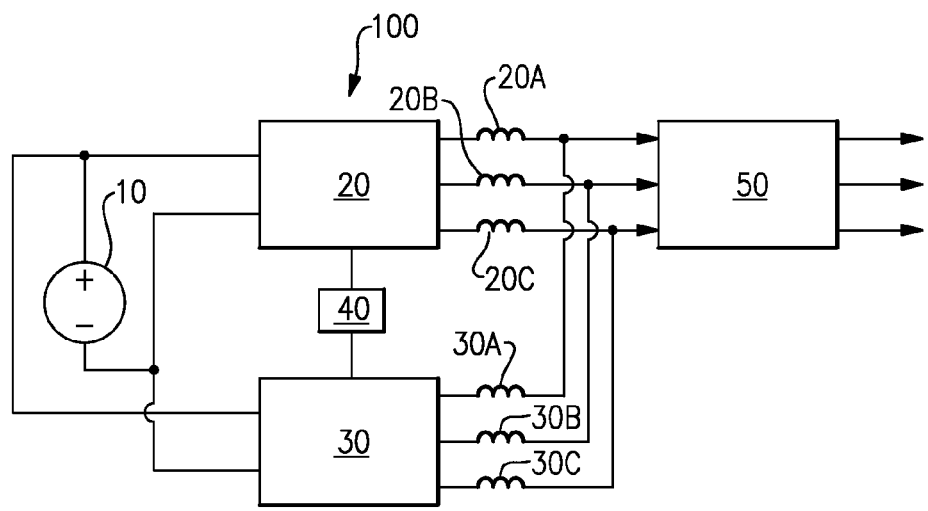
FIG. 1 illustrates an example power system using an active switching ripple filter.

FIG. 1 illustrates a sample power electronics system 100. By way of example, the power electronics system 100 could be utilized in an aircraft to convert DC power from a DC power source into AC power. Alternately the power system electronics 100 could be used in any system where such a conversion is desired, such as any inverters tied to a power grid or motor drive inverters. The power electronics system 100 includes a power source 10, a main inverter 20, and an active switching ripple filter inverter 30 (alternatively referred to as active switching ripple filter 30). Each of the inverters 20, 30 includes three phase power outputs which are connected to filter inductor 20A, 20B, 20C (for the main inverter 20) and 30A, 30B, 30C (for the active switching ripple filter 30). Each of the main inverter filter inductors 20A, 20B, 20C have outputs which are connected to a corresponding active switching ripple filter inductors 30A, 30B, 30C output, thereby combining the power outputs of the main inverter 20 and the active switching ripple filter inverter 30. The power output signals are connected to a filter 50, which could be a differential mode filter, common mode filter, or a combination of the two. In some cases, the filter 50 may be omitted and the output terminal of the inductors 20A, 20B, 20C, and 30A, 30B, 30C can be directly connected to a load. The filter 50 filters out noise at high frequency related to the switching frequency of the active switching ripple filter 30. A microcontroller 40 controls the main inverter 20, and the active switching ripple filter inverter 30.

The microcontroller 40 (alternatively referred to as the controller 40) switches the active switching ripple filter inverter 30 at a frequency which is significantly higher than the switching frequency of the main inverter 20. Also, because of the much higher switching frequency of the active switching ripple filter inverter 30, the associated filter inductors 30A, 30B, and 30C are much smaller than inductors 20A, 20B, and 20C. The above result in the active switching ripple filter 30 having an output signal which has a ripple current that cancels at least a significant portion of a ripple current on the main inverter 20 output signal, when the two output signals are added together.

In the example illustrated in FIG. 1, the main inverter 20 operates independently to generate a multi-phase power signal of a desired magnitude and frequency. The main inverter 20 generates pulse width modulated (PWM) square wave outputs. The PWM voltage waveforms are applied to the output filter inductor 20A, 20B, 20C and a load. As a result of the filtering, a ripple current is generated on the waveform output of the inductors 20A, 20B, and 20C. The active switching ripple inverter 30 is controlled to provide substantially reduced real or reactive power to the load relative to the main inverter 20 and therefore does not significantly affect the magnitude of the main inverter 20 output once the signals are combined. This results in the frequency and magnitude of the output power being determined by the frequency and magnitude of the main inverter 20 output.

Since a substantially reduced real or reactive power is output by the active switching ripple filter 30, the output of the filter inductors 30A, 30B, 30C of the active switching ripple filter 30 is limited to a switching ripple current. The microcontroller 40 controls the active switching ripple filter 30 to output zero fundamental frequency current. Using an appropriate PWM strategy, the switching frequency ripple current generated by inverter 20 will be absorbed by the inverter 30.

Figure 2:
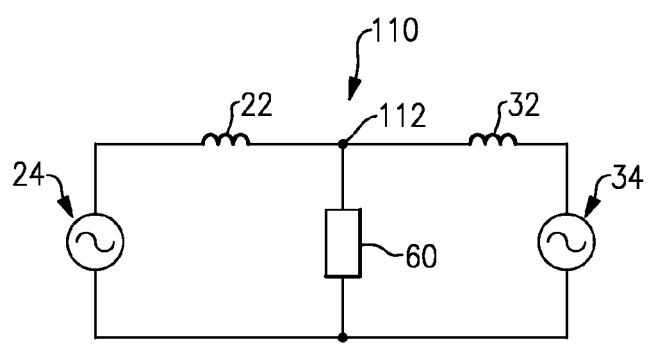
FIG. 2 illustrates an equivalent circuit for single phase diagram of an active switching ripple filter circuit.

FIG. 2 illustrates a simplified example circuit of a single phase 110 of the example of FIG. 1. The circuit has an inductor filter 22 which corresponds to the main inverter filter inductor 20A, 20B, 20C of FIG. 1, and a filter inductor 32 which corresponds to the active switching ripple filter inductors 30A, 30B, 30C of the example of FIG. 1. The circuit also has power signal source 24, which is a simplified combination of the power source 10 and the main inverter 20 of FIG. 1, and a power signal source 34 which represents a simplified combination of the power source 10 and the active switching ripple filter inverter 30 of the example of FIG. 1. The output of each of the filter inductors 22, 32 are connected to a load 60 which has a return connection to each of the power sources 24, 34.

The main inverter power source 24 outputs a PWM square wave signal which has a fundamental frequency and magnitude equal to the desired frequency and magnitude of the signal at the load 60 (the main inverter output). The switching frequency of the main inverter power source 24 is fsL. This signal is passed through the filter inductor 22 where it is smoothed into a sinusoidal signal having the same fundamental frequency and magnitude as the square wave signal. The active switching ripple filter power source 34 outputs a PWM square wave which has a very high switching frequency relative to the frequency of the square wave output by the main inverter power source 24. The switching frequency of 34 is fsH. By way of example, the switching frequency (fsH) of the active switching ripple filter power source 34 could be 10 to 100 (one or more orders of magnitude) times the switching frequency (fsL) of the main inverter power source 24.

The main inverter power source 24 produces the active and reactive power required by the load 60. The active switching ripple filter 30 additionally has a very low power relative to the main inverter 20. The active switching ripple filter 30 only handles the switching frequency ripple current generated by the main inverter 20. By way of example, the active switching ripple filter 30 could operate at 5%-10% of the power level of the main inverter 20, depending on the current ripple amplitude of the main inverter. The controller 40 (pictured in FIG. 1) sets the active and reactive power at a fundamental frequency of the active switching ripple filter power source 34 to zero, and controls the signal's frequency and magnitude.

The outputs of the main inverter filter inductor 22 and the active switching ripple filter inductor 32 are combined at electrical node 112. When the two signals are combined, the ripple currents of each signal cancel out resulting in a signal with substantially reduced or eliminated ripple current. Since the active switching ripple filter power source 34 signal contains no active or reactive power element, the magnitude of the power transmitted in the main inverter power source 24 signal is, at most, marginally affected by the combination of the two signals.

The common mode voltage of the main inverter power source 24, which is at the switching frequency of fsL is also adjusted by the active switching ripple filter power source 34. As a result, only a common mode voltage at frequency of fsH is still present, which significantly reduces the requirement for common mode filter.

The active switching ripple filter power source 34 reduces both the differential and common mode noise. As a result, smaller common mode and differential mode filters are needed. If a small common mode and/or differential mode filter 50 is added, as is illustrated in FIG. 1, the switching frequency noise is removed from the signal and the signal is a clean (noise free) power signal provided to the load 60.

In order to explain the operating principle in detail, some equations can be used for single phase equivalent circuit shown in FIG. 2. The load voltage and current at load 60 are $$v_{oa} = V \cdot \sin(\omega t) \quad (1)$$

$$i_{oa} = I \cdot \sin(\omega t + \theta) \quad (2)$$

The main inverter power source 24 has to output a voltage of:

$$v_a = V \cdot \sin(\omega t) + I \cdot \sin(\omega t + \theta) \cdot Z(L_1) + \delta, \quad (3)$$

The first two elements of the equation ($V \cdot \sin(\omega t)$) and ($I \cdot \sin(\omega t + \theta)$) ensure that the output voltage ($v_a$) supplies the fundamental current to the load. $\delta$ is the switching ripple component of the main inverter 20 output, $Z(L_1)$ is the impedance of the inductor 22. With this voltage, the main inverter 20 output current ($i_a$) can be expressed as follows:

$$i_a = \frac{v_a - v_{oa}}{Z(L_1)} = I \cdot \sin(\omega t + \theta) + \frac{\delta}{Z(L_1)} \quad (4)$$

In order to cancel the main inverter 20 ripple current, the output current of the active switching ripple filter output current ($i_u$) is $$i_u = i_{oa} - i_a = -\frac{\delta}{Z(L_1)} \quad (5)$$

As a result, the output voltage of active switching ripple filter 30 should be $$v_u = V \cdot \sin(\omega t) - \frac{Z(L_2)}{Z(L_1)} \delta \quad (6)$$

$$= V \cdot \sin(\omega t) - \frac{L_2}{L_1}(v_a - V \cdot \sin(\omega t) - I \cdot \sin(\omega t + \theta) \cdot Z(L_1))$$

Z(L2) is the impedance of inductor 32, L1 and L2 are inductances of 22 and 32 respectively. As can be seen from the above equation, the output of the active switching ripple filter 30 has to be load voltage minus a weighted component of the voltage difference between the actual main inverter 20 output and its fundamental element. With that, the output voltage will be free of any switching ripple at frequency lower than $f_{sH}$.

The inductance requirement of the filter inductors 30A, 30B, 30C decreases as the switching frequency of the connected inverter 30 increases. On the example of FIG. 1, the switching inverter 30 is operated at a much higher frequency than the main inverter 20 in order to generate the canceling signal. Therefore, the filter inductors 30A, 30B, 30C have a much lower inductance requirement. Since the filter inductors 30A, 30B, 30C have a lower inductance requirement and much lower current rating, they can be made physically smaller, and there is a decrease in the overall weight of the system due to a reduction in the size of the main inverter filter.

Figure 3:
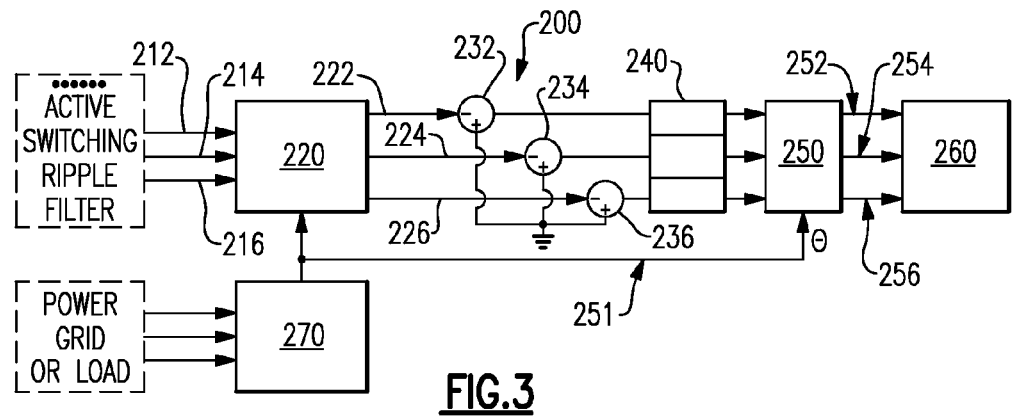
FIG. 3 illustrates an example control scheme that could be used to control an active switching ripple filter.

FIG. 3 illustrates a block diagram of a sample control system 200 which is used by the microcontroller 40 (illustrated in FIG. 1) to control the frequency and magnitude of the signal output of the active switching ripple filter inverter 30. The control system 200 has input connections 212, 214, 216, which senses the three phase output current of active switching ripple filter 30 (illustrated in FIG. 1). The converter block 220 has three outputs 222, 224, 226 each of which corresponds to a DC component of the active switching ripple filter 30 signal with the phase signal from phase lock loop 270. Each of the DC component signals is connected to a summer 232, 234, 236. Each of the summers 232, 234, 236 have additional inputs which are connected to a reference signal, which is zero or ground to regulate the inverter, such that there is no fundamental frequency real or reactive power going through the active switching ripple filter 30. The outputs of summers 232, 234, 236 are connected to a proportional integral (PI) regulator 240.

Figure 4:
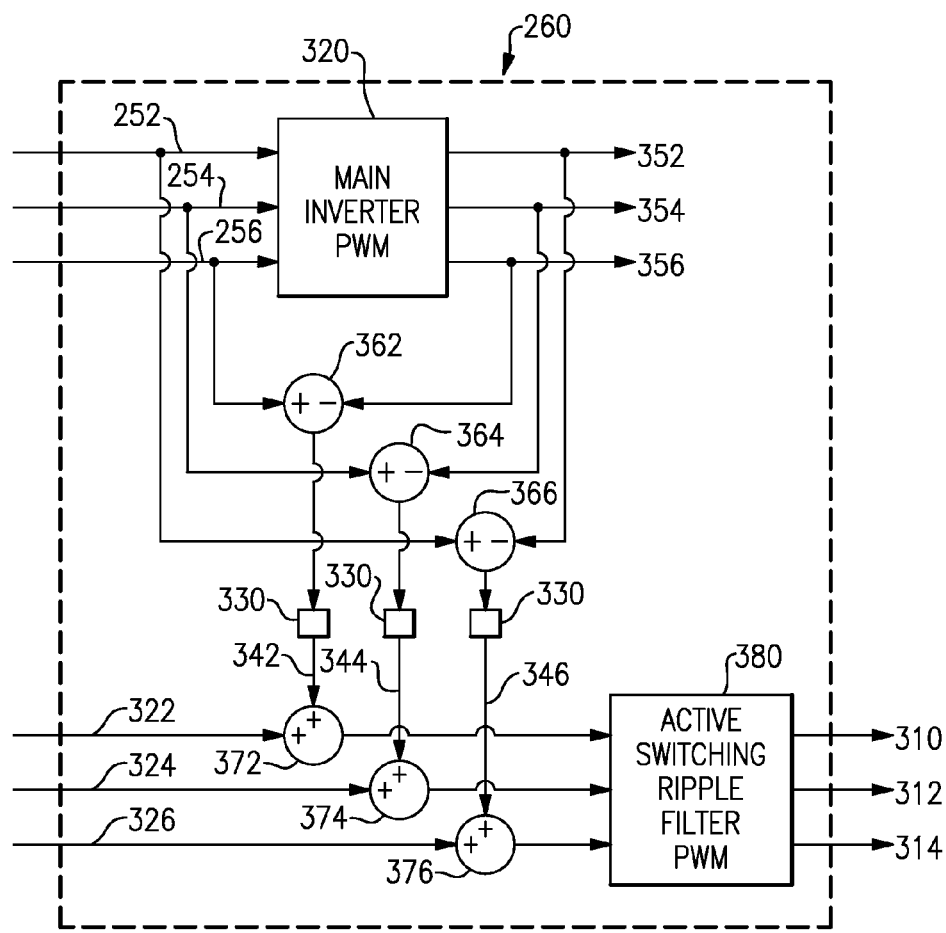
FIG. 4 illustrates an example pulse width modulation method by which an active switching ripple filter eliminates ripple currents.

The PI controller 240 outputs three signals, each of which connects to a second converter block 250. The second converter block 250 also has an input for a phase signal 251 which is output from the phase lock loop block 270. The second converter block 250 transforms the signals back into a three phase signal with each phase on an independent output 252, 254, 256. Each of the outputs 252, 254, 256 is then accepted as an input by modulator 260, which functions to control the frequency and magnitude of the active switching ripple filter inverter 30 (illustrated in FIG. 1), such that the active switching ripple filter 30 has a desired ripple current. The details of the modulator 260 (also referred to as pulse width modulator 260) are shown in FIG. 4.

In order to control the active switching ripple filter 30, the control system 200 initially accepts a signal 212, 214, 216 from the active switching ripple filter 30 and converts that signal into its DC components. The DC component signals are each then driven to 0V in the summers 232, 234, 236, due to their summation with ground, the DC component signals are then processed in the PI controllers 240, which can be configured according to known techniques. The outputs of the PI controller 240 are accepted by the second converter block 250. The DC component signals are then combined with a phase angle received from phase lock loop 270, and reconverted into an AC signal which is output as three phases 252, 254, 256. These outputs are processed in pulse width modulator 260, which is used to control the active ripple switching inverter 30.

The phase signal 251 can also be obtained from the main inverter control. In cases when this signal is available from the main inverter 20 of FIG. 1, the phase lock loop 270 is not needed.

The values received by the pulse width modulator 260 allow the active switching ripple inverter 30 to be driven at a higher frequency, and cancel the ripple current produced in the main power inverter inductor 20A, 20B, 20C, and simultaneously have minimal impact on the magnitude or frequency of the output signal. At the same time, the control of the main inverter 20 is not affected. The described control system 200 is exemplary only, and a skilled artisan would be able to adapt it to any system utilizing an active switching ripple filter. Therefore, our disclosure is not limited to the specific illustrated example.

FIG. 4 illustrates the modulator 260, which generates output modulation signals 310, 312, 314 for controlling the active switching ripple filter 30 of FIG. 1. The modulator 260 has a set of inputs 252, 254, 256 from the main inverter control system, which are the reference signals for main inverter three phase modulator and they are accepted by a main inverter PWM 320. The main inverter PWM 320 then outputs a set of pulse width modulated control signals 352, 354, 356 which control the main inverter 20. The input signals 252, 254, 256 are each summed with the inverse of their corresponding output signals 352, 354, 356 in a set of summation blocks 362, 364, 366.

Each of the summation blocks 362, 364, 366 outputs a value which is multiplied by a constant in a multiplier block 330. Each of the multiplier blocks 330 has an output 342, 344, 346 which is summed with a second set of inputs 322, 324, 326 in a set of summation blocks 372, 374, 376. The outputs of the second set of summation blocks 372, 374, 376 are input into an active switching ripple filter PWM 380, which generates the output modulation signals 310, 312, 314 based on known techniques. The modulator 260 allows the active switching ripple filter 30 to be controlled based on the main inverter 20 signals. This allows the active switching ripple filter 30 output signals to be tailored to eliminate ripple currents present on the main inverter 20 output, and thereby achieve the desired clean power signal.

Figure 5:
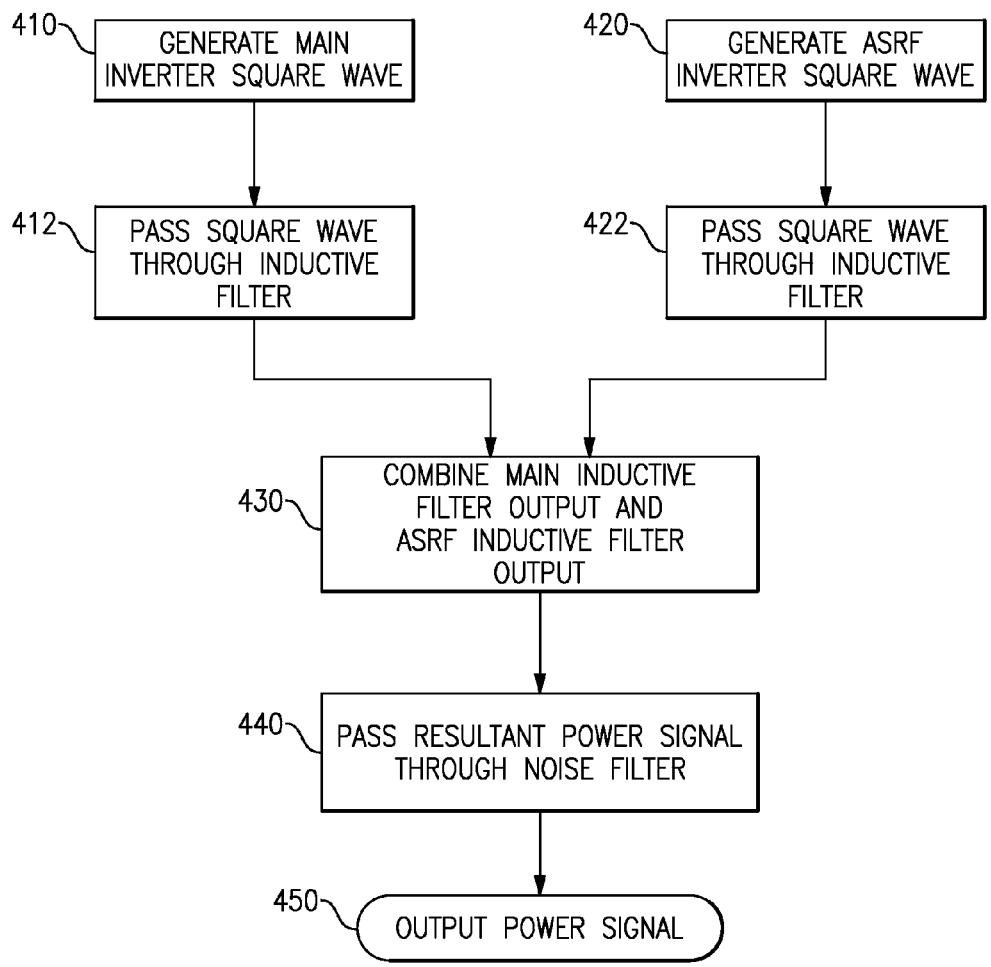
FIG. 5 is a flowchart illustrating a method for removing ripple filter current from a power signal.

A flowchart illustrating the method used to remove the ripple current from the power signal is shown in FIG. 5. Initially, the method generates a PWM square wave in the main inverter 20 in a main inverter square wave step 410, and concurrently generates a PWM square wave in an active switching ripple filter (ASRF) inverter 30 in an active switching ripple filter square wave step 420. Each of the square waves are then concurrently passed through corresponding filter inductors 20A, 20B, 20C, 30A, 30B, 30C in the inductive filtering steps 412, 422. After the wave forms have been passed through the filter inductors 20A, 20B, 20C, 30A, 30B, 30C, current ripple at switching frequency is generated through the filter inductors 20A, 20B, 20C.

The two power signals are then combined into a single signal in a combine signals step 430. The combining of the signals allows the ripple currents acquired in the pass through inductive filter step 412 of the main inverter signal to be at least substantially cancelled by the ripple current on the active switching ripple filter signal. The resultant output current is an AC sinusoidal power signal, which has relatively little ripple current. The AC power signal is passed through a common mode and/or differential mode filter 440. Finally, a clean power signal is output to connected electronics in an output power signal step 450, thereby powering the connected electronics.

While FIG. 1 illustrates a system 100 in which the main inverter 20 and the active switching ripple filter inverter 30 are simultaneously connected to a DC power source, an alternate configuration can be used in which the main inverter 20 is connected to the DC power source 10, and the active switching ripple filter inverter 30 is connected to an alternate source of power, such as a set of capacitors. In cases where a DC capacitor bank is used as the power source of active switching ripple filter inverter 30, the dc voltage can be controlled by active switching ripple filter inverter 30 with known control techniques. Similar modulation strategy as shown in FIG. 4 can be used to eliminate the current ripple from the main inverter.

While the above examples have been described with regards to a power generation system, it is understood that the disclosed apparatus can be adjusted to operate at an AC/DC rectifier with minimal modifications.

The active switching ripple filter has wide application range. Some examples are a grid tied inverter/rectifier and motor/generator drive systems.

Although an example embodiment has been disclosed, a worker of ordinary skill in this art would recognize that certain modifications would come within the scope of this invention. For that reason, the following claims should be studied to determine the true scope and content of this invention.

What is claimed is:

1. A power generation system comprising:
a power source;
a main inverter electrically coupled to said power source;
an active switching ripple filter inverter coupled to said power source;
a first set of filter inductors connected to an output of said main inverter;
a second set of filter inductors connected to an output of said active switching ripple filter inverter; and
an electrical node combining an output of said first set of filter inductors and an output of said second set of filter inductors.

2. The power generation system of claim 1, further comprising a controller coupled to said main inverter and said active switching ripple filter inverter.

3. The power generation system of claim 2, wherein said controller is configured to cause said main inverter to have a first switching frequency and to cause said active ripple switching filter inverter to have a second switching frequency.

4. The power generation system of claim 3, wherein said second switching frequency is higher than said first switching frequency.

5. The power generation system of claim 1, wherein said first set of filter inductors are configured to impose a first ripple current on said output of said main inverter, and said second set of filter inductors are configured to impose a second ripple current on said output of said active switching ripple filter inverter.

6. The power generation system of claim 5, wherein said second ripple current at least substantially cancels said first ripple current at said electrical node.

7. The power generation system of claim 1, further comprising a noise filter connected to a set of said electrical nodes and having a set of AC power signal outputs.

8. A method for generating a ripple current free power signal comprising:
    operating a main inverter at a first switching frequency;
    operating an active switching ripple filter at a second switching frequency;
    filtering an output of said main inverter in a first set of filter inductors;
    filtering an output of said active switching ripple filter in a second set of filter inductors; and
    combining an output of said first set of filter inductors and an output of said second set of filter inductors, thereby creating an output power signal.

9. The method of claim 8, wherein said step of operating said active switching ripple filter at said second frequency comprises switching said active switching ripple filter at a frequency one or more orders of magnitude higher than the frequency at which said main inverter is switched.

10. The method of claim 9, wherein said step of controlling said main inverter and said active switching ripple inverter comprises the steps of:
    converting a main inverter output into Direct Current (DC) components;
    forcing each of said DC components to approximately 0V; and
    reconverting said DC components into a set of AC output components.

11. The method of claim 10, wherein said step of controlling said main inverter and said active switching ripple filter inverter comprises the additional step of using said AC output components to drive a pulse width modulation control of said active switching ripple filter.

12. The method of claim 8, wherein said step of combining an output of said first set of filter inductors and an output of said second set of filter inductors causes a ripple current on said output of said active switching ripple filter to approximately cancel a ripple current on said output of said main inverter.

13. The method of claim 12, wherein a common mode voltage is adjusted to a higher frequency, thereby reducing a common mode filter requirement.

14. The method of claim 8, further comprising the step of passing said output power signal through a noise filter, and thereby removing common mode and differential mode noise from the output power signal.

15. The method of claim 8, wherein said step of operating said main inverter at said first switching frequency comprises providing power from a power source to said main inverter at a first power level.

16. The method of claim 15, wherein said step of operating said active switching ripple filter at said second switching frequency comprises providing power to said active switching ripple filter at a second power level different from said first power level.

17. The method of claim 16, wherein the magnitude of said second power level is in the range of 5-10% of the magnitude of said first power level.

18. An active switching ripple filter comprising;
    an inverter component having a power signal output;
    a set of filter inductors connected to said power signal output and configured to convert said power signal output into a different waveform; and
    a controller controllably coupled to said active switching ripple filter and capable of controlling a switching frequency of said inverter component and a magnitude of said power signal output and said controller being communicatively coupled to an external inverter such that said controller can detect at least a power output and frequency of said external inverter.

19. The active switching ripple filter of claim 18, wherein said controller is configured such that a magnitude of power output by said inverter component is in the range of 5% to 10% of the magnitude of power output by said external inverter.

20. The active switching ripple filter of claim 18, wherein said controller is configured such that a frequency of a power signal output by said inverter component is one or more orders of magnitude higher than a frequency of the power signal output by said external inverter.

* * * * *